(No Model.)
A. ANDRÉN.
DRAWING KNIFE.
No. 544,946. Patented Aug. 20, 1895.
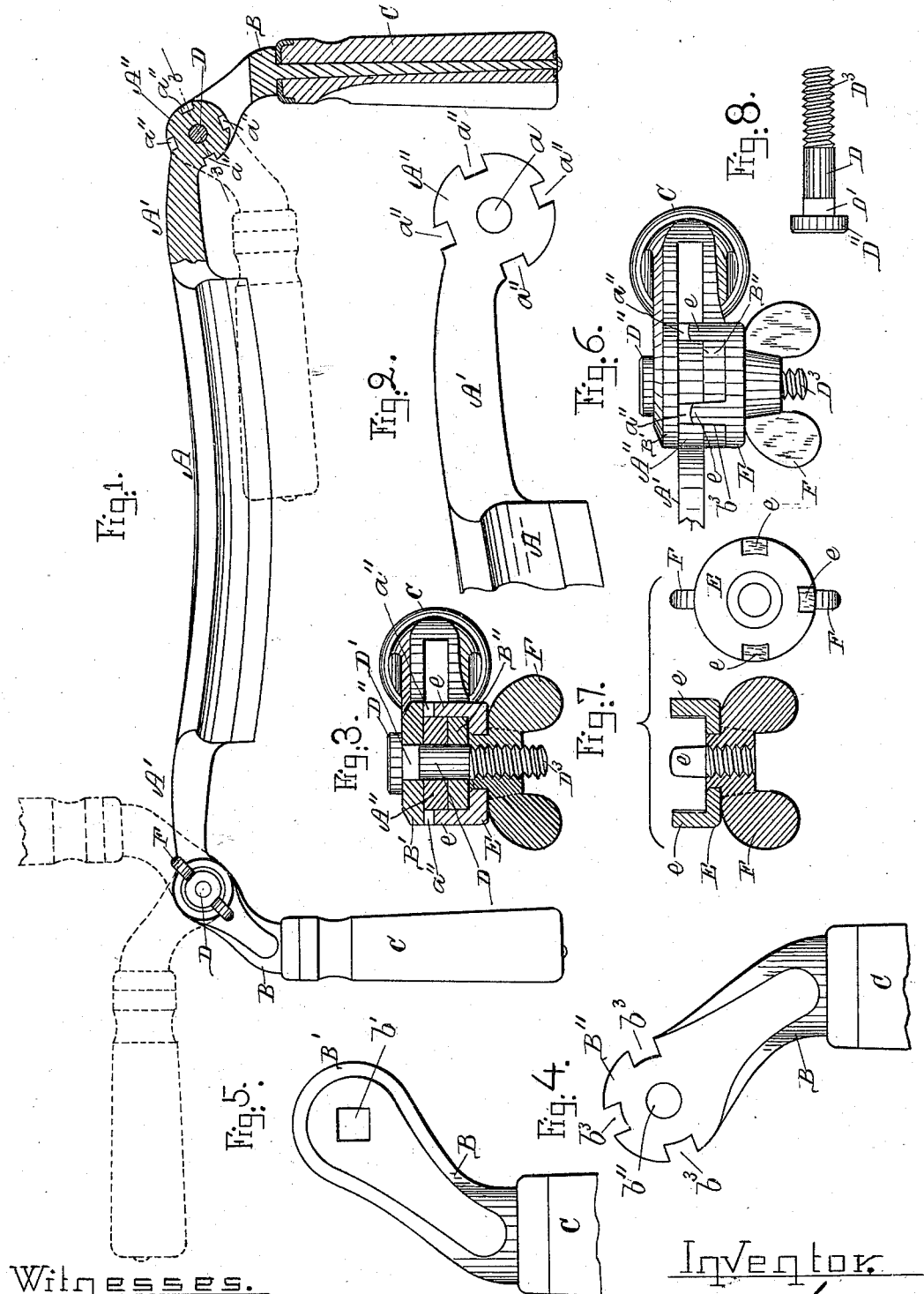
Witnesses.
Lauritz N. Möller.
Charles A Harris
Inventor.
Alban Andrén.

UNITED STATES PATENT OFFICE.

ALBAN ANDRÉN, OF BEVERLY, MASSACHUSETTS.

DRAWING-KNIFE.

SPECIFICATION forming part of Letters Patent No. 544,946, dated August 20, 1895.

Application filed May 11, 1895. Serial No. 548,896. (No model.)

*To all whom it may concern:*

Be it known that I, ALBAN ANDRÉN, a citizen of the United States, and a resident of Beverly, in the county of Essex and State of Massachusetts, have invented new and useful Improvements in Drawing-Knives, of which the following, taken in connection with the accompanying drawings, is a specification.

This invention relates to improvements in drawing knives or tools with folding handles; and it consists in a simple and effective means for securing the handles in various positions to the ends of the cutting-blade, and it is carried out as follows, reference being had to the accompanying drawings, wherein—

Figure 1 represents a side elevation of the invention, showing one end of the blade and its pivoted handle in section. Fig. 2 represents a full-size detail side elevation of one end of the cutting-blade. Fig. 3 represents a cross-section on the line 3 3 in Fig. 1 shown as enlarged. Fig. 4 represents a front view of the handle-shank. Fig. 5 represents a rear view of said handle-shank. Fig. 6 represents a top plan view of the blade end and its adjustable connection to the handle. Fig. 7 represents a rear view and cross-section of the locking-washer and nut by means of which the handle-shank is locked to the blade end, and Fig. 8 represents a detail side view of the bolt on which the blade end is pivoted.

Similar letters refer to similar parts wherever they occur on the different parts of the drawings.

In Figs. 1 and 2, A represents the cutter-blade of a drawing-knife or edge tool, having shanks $A'A'$ and circular end hubs $A''$, as is common in drawing-knives having adjustable handles. Each hub has a cylindrical perforation $a$ for receiving the cylindrical portion D of the pivot-bolt, as shown in Figs. 1, 2, 3, 6, and 8.

B B represent the handle-shanks, which are secured in any suitable or well-known manner to the handles C C, as usual in devices of this kind.

$B'$ and $B''$ represent the bifurcated wings of the handle-shank, between which the hub $A''$ of the cutting blade or knife A is received, as shown. The said pivot-bolt has a square or polygonal portion $D'$ near its head $D''$, which portion $D'$ fits into a correspondingly-shaped perforation $b'$ in the wing $B'$, as shown. Through the wing $B''$ is made a cylindrical perforation $b''$ for receiving the cylindrical portion D of the pivot-bolt, as shown in Figs. 3, 4, and 8. The outer end $D^3$ of said pivot-bolt is screw-threaded, as shown in Figs. 3, 6, and 8, and adapted to receive the adjustable fastening-nut F, which is preferably loosely connected to a locking-disk E, having locking-prongs $e\ e\ e$. Shown in Figs. 1, 3, 6, and 7.)

The circular blade end $A''$ has a series of locking notches or recesses $a''\ a''\ a''$, as shown in Fig. 2, and similar notches or recesses $b^3\ b^3\ b^3$ are made on the periphery of the front wing $B''$ of the handle-shank, as shown in Fig. 4. Said notches or recesses $a''$ $b^3$ correspond in size and shape to the locking-prongs $e\ e\ e$ on the washer E, and serve to receive such prongs, as shown in Figs. 3 and 6.

If the blade end and handle-shank are locked together in any position, as shown in Figs. 1, 3, and 6, and it is desired to change the position of the handle relative to the cutting-blade, all that is necessary to do is to unscrew or turn the nut F to the left sufficiently to cause the inner ends of prongs $e\ e$ to become disengaged from the notches $a''\ a''$ in the hub of the knife-blade, after which the handle may be swung to another desired position and again locked to the blade by turning down the nut F, causing the prongs of the washer E to interlock with the notches or recesses $a''$. In the operation of this adjustable locking device the notches $b^3$ in the wing $B''$ serve as guides for the prongs $e\ e$, and the latter are at no time disengaged from the wing-notches $b^3$, but simply moved outward sufficiently to cause them to be disengaged from the notches $a''\ a''$ in the hub of the knife-blade. In practice I prefer to loosely journal or connect the nut F to the washer E, so as to impart a longitudinal movement to the said washer and its prongs by the turning of the nut F in either direction; but such washer and nut may be disconnected from each other, if so desired, without departing from the essence of my invention.

It will be noticed that in this my invention there is no longitudinal adjustment of the pivot-bolt that connects the knife and handle-shank, and said bolt does not in itself constitute a locking device, but is simply a pivot-bolt on which the blade end is at all times loosely hung, and the interlocking of the handle-shank to the blade end is accomplished by means of the longitudinally-adjustable washer, the prongs of which enter recesses in one wing of the handle-shank and the end hub of the blade.

This my improved locking device is very strong and durable, and is particularly well adapted for drawing-knives or edge tools when it is required to change the position of the handle or handles relative to the blade, and to secure such firmly in position after being adjusted.

Having thus fully described the nature, construction, and operation of my invention, I wish to secure by Letters Patent and claim—

1. The combination with a cutting blade A having a shank A′ provided with a hub A″ containing notches $a''$, of a bifurcated handle-shank B having ears B′ and B″, one ear being smooth and the other having notches $b^3$ in its periphery, a non-rotary bolt D passing through the ears and hub, a locking-disk E mounted on and movable along the bolt and having locking prongs $e$ adapted to engage the said notches, and a nut screwed on the bolt for moving the locking-disk into engagement with the notches in the notched hub and ear, substantially as and for the purposes described.

2. The combination with a cutting blade A having a shank A′ provided with a hub A″ containing a plurality of notches $a''$ in its periphery, a bifurcated handle-shank B embracing the hub of the cutting blade shank and having ears B′ B″, one of which is smooth and the other provided with a plurality of notches $b^3$ in its periphery adapted to register with the notches in the periphery of the hub on the cutting blade shank, a bolt D extending through the hub and ears and having an angular portion engaging one of the ears, a locking washer E mounted on and movable along the bolt and having locking prongs $e$ to enter the notches in the peripheries of the hub and ear, and a rotary nut F screwed on the bolt and bearing against the locking-disk, substantially as and for the purposes described.

In testimony whereof I have signed my name to this specification, in the presence of two subscribing witnesses, on this 29th day of April, A. D. 1895.

ALBAN ANDRÉN.

Witnesses:
LAÛRITZ N. MÕLLER,
CHARLES A. HARRIS.